United States Patent
Sammour et al.

(10) Patent No.: US 8,855,047 B2
(45) Date of Patent: Oct. 7, 2014

(54) METHOD AND APPARATUS FOR PCDP DISCARD

(75) Inventors: Mohammed Sammour, Montreal (CA); Stephen E. Terry, Northport, NY (US)

(73) Assignee: Interdigital Patent Holdings, Inc., Wilmington, DE (US)

( * ) Notice: Subject to any disclaimer, the term of this patent is extended or adjusted under 35 U.S.C. 154(b) by 1565 days.

(21) Appl. No.: 12/240,092

(22) Filed: Sep. 29, 2008

(65) Prior Publication Data

US 2009/0103478 A1   Apr. 23, 2009

Related U.S. Application Data

(60) Provisional application No. 60/976,674, filed on Oct. 1, 2007.

(51) Int. Cl.
| | |
|---|---|
| *H04W 4/00* | (2009.01) |
| *H04W 80/02* | (2009.01) |
| *H04L 29/08* | (2006.01) |
| *H04L 1/18* | (2006.01) |
| *H04L 29/06* | (2006.01) |

(52) U.S. Cl.
CPC .............. *H04L 1/1874* (2013.01); *H01L 1/188* (2013.01); *H04W 80/02* (2013.01); *H04L 69/324* (2013.01); *H04L 69/28* (2013.01)
USPC .......................................... 370/328; 370/469

(58) Field of Classification Search
USPC ................... 370/328, 338, 401, 469
See application file for complete search history.

(56) References Cited

U.S. PATENT DOCUMENTS

| | | | |
|---|---|---|---|
| 6,857,095 B2 * | 2/2005 | Suumaki et al. .............. | 714/748 |
| 6,904,016 B2 * | 6/2005 | Kuo et al. ...................... | 370/235 |
| 6,925,298 B2 * | 8/2005 | Ho ................. | 455/411 |
| 7,054,270 B2 | 5/2006 | Yi et al. | |
| 7,266,105 B2 * | 9/2007 | Wu ............................... | 370/338 |
| 7,327,734 B2 * | 2/2008 | Yi et al. ......................... | 370/394 |
| 7,796,505 B2 * | 9/2010 | Olsson et al. ................. | 370/229 |
| 2001/0007137 A1 | 7/2001 | Suumaki et al. | |

(Continued)

FOREIGN PATENT DOCUMENTS

| | | |
|---|---|---|
| JP | 2005-539465 A | 12/2005 |
| JP | 2007-028653 A | 2/2007 |
| JP | 2007-195219 A | 8/2007 |
| KR | 10-2003-17953 A | 3/2003 |

OTHER PUBLICATIONS

TSGR2#4(99)407: TSG-RAN Working Group 2 (Radio layer 2 and Radio layer 3) Berlin, May 25-28, 1999; pp. 1-2.*

(Continued)

*Primary Examiner* — Ricky Ngo
*Assistant Examiner* — Christine Ng
(74) *Attorney, Agent, or Firm* — Condo Roccia Koptiw LLP

(57) ABSTRACT

A method and apparatus for discarding a packet data convergence protocol (PDCP) service data unit (SDU) are disclosed. A PDCP layer sets a timer and discards a PDCP SDU upon expiration of the timer. The timer may be set upon receiving the PDCP SDU from an upper layer or upon submitting the PDCP SDU to a lower layer for transmission. The timer and a radio link control (RLC) discard timer may be coordinated. Alternatively, the PDCP layer may discard the PDCP SDU based on a notification from an RLC layer or based on a PDCP status report.

31 Claims, 10 Drawing Sheets

(56) References Cited

U.S. PATENT DOCUMENTS

| | | | |
|---|---|---|---|
| 2001/0030965 A1 | 10/2001 | Tourunen et al. | |
| 2002/0041567 A1* | 4/2002 | Yi et al. | 370/236 |
| 2004/0185860 A1* | 9/2004 | Marjelund et al. | 455/450 |
| 2006/0052137 A1* | 3/2006 | Randall et al. | 455/560 |
| 2006/0098574 A1 | 5/2006 | Yi et al. | |
| 2007/0106924 A1 | 5/2007 | Seidel et al. | |
| 2009/0046631 A1* | 2/2009 | Meylan et al. | 370/328 |
| 2011/0149865 A1 | 6/2011 | Lee et al. | |

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V 8.0.0, (Apr. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V 8.1.0, (Jul. 2007).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300, V 8.6.0, (Sep. 2008).

Third Generation Partnership Project, "Technical Specification Group Radio Access Network; Evolved Universal Terrestrial Radio Access (E-UTRA) Packet Data Convergence Protocol (PDCP) specification (Release 8)", 3GPP TS 36.323 V 1.0.0, (Sep. 2007).

Third Generation Partnership Project, "Technical Specification Group Radio Access Network; Evolved Universal Terrestrial Radio Access (E-UTRA) Packet Data Convergence Protocol (PDCP) specification (Release 8)", 3GPP TS 36.323 V8.3.0, (Sep. 2008).

Third Generation Partnership Project, "Technical Specification Group Radio Access Network; Evolved Universal Terrestrial Radio Access (E-UTRA) Radio Link Control (RLC) protocol specification (Release 8)," 3GPP TS 36.222, V 1.0.0, 3GPP TS 36.222, V 1.0.0, (Sep. 2007).

Third Generation Partnership Project, "Technical Specification Group Radio Access Network; Evolved Universal Terrestrial Radio Access (E-UTRA) Radio Link Control (RLC) protocol specification (Release 8)," 3GPP TS 36.222, V 1.0.0, 3GPP TS 36.222, V 8.3.0, (Sep. 2008).

Ericsson, "Report from off-line discussions on SDU Discard functionality," 3GPP TSG-RAN WG2 #60, R2-075237 (Nov. 5-9, 2007).

Ericsson, "RLC SDU Discard," TSG-RAN Working Group 2 (Radio layer 2 and Radio layer 3), TSGR2#4(99)407 (May 25-28, 1999).

Ericsson, "SDU Discard," 3GPP TSG-RAN WG2 #59, R2-073230 (Aug. 20-24, 2007).

Ericsson, "Specifying SDU Discard function for the UE," 3GPP TSG-RAN WG2 #60, R2-074703 (Nov. 5-9, 2007).

Lakkakorpi et al., "Comparison of Different Active Queue Management Mechanisms for 3G Radio Network Controllers," IEEE Wireless Communications and Networking Conference, pp. 80-85 (Apr. 2006).

* cited by examiner

METHOD AND APPARATUS FOR PCDP DISCARD

CROSS REFERENCE TO RELATED APPLICATIONS

The present application relates to and claims the priority of U.S. Provisional Application No. 60/976,674, filed Oct. 1, 2007.

FIELD OF INVENTION

This application is related to wireless communications.

BACKGROUND

The Third generation partnership project (3GPP) has initiated a long term evolution (LTE) program to bring new technology, new network architecture and configuration, and new applications and services to the wireless cellular network in order to provide improved spectral efficiency, reduced latency, faster user experiences and richer applications and services at lower cost.

The LTE architecture protocol comprises multiple layers. FIG. 1 is an illustration of the LTE architecture's user plane protocol stack. Layer 1 refers to physical layer (PHY). PHY offers information transfer services to the higher layers by means of transportation channels, such as downlink (DL) and uplink (UL) transportation channels. Layer 2 is divided into three sublayers, Medium Access Control (MAC), Radio Link Control (RLC) and Packet Data Convergence Protocol (PDCP). Above the PDCP sublayer, in layer 3 is the Radio Resource Control (RRC) Layer within the control plane, and is the network layer (e.g. Internet Protocol (IP)) within the user plane.

The RLC sublayer supports three types of data transmission modes, Acknowledge Mode (AM), Unacknowledged Mode (UM) and Transparent Mode (TM). RLC sublayer also supports segmentation of SDUs (Service Data Unit) and PDUs (Packet Data Unit). An RLC entity may segment an RLC SDU into one or multiple RLC PDU(s) corresponding to the RLC SDU. The terminology SDU and PDU is used interchangeably depending upon the layer view. A SDU is a packet that is interchanged, that is, received from an upper layer in the transmitting device, or passed to an upper layer in the receiving device. A PDU is a packet generated by a layer and passed on to a lower layer in the transmitting device, or received from a lower layer in the receiving device. Therefore, a PDCP PDU is an RLC SDU. Similarly, a RLC PDU is a MAC SDU, etc. Hence the terminology, of whether a packet is termed a "PDU" or an "SDU" depends upon the point of view of the layer being considered. Typically, each layer adds information, in the form of a header, to SDU data to generate a PDU. The main services and functions provided by the RLC sublayer are:
1. Transfer of upper layer PDUs supporting AM, UM and TM.
2. In sequence delivery of upper layer PDUs except at handover in the uplink.
3. Duplicate detection.
4. Segmentation of dynamic PDU size, no need for padding.
5. Re-segmentation of PDUs that need to be retransmitted
6. Error correction
7. Protocol error detection and recovery
8. Reset
9. SDU discard.

The PDCP sublayer provides PDCP Service data Unit (SDU) services through the service access point (SAP) for user-plane (U-plane) packet data and for control-plane (C-plane) RRC messages. The PDCP is responsible for the following PDCP functions or procedures:
1. Header compression and decompression having robust header compression ROHC) only;
2. Transfer of user data—transmission of user data means that PDCP receives PDCP service data units (SDUs) from the upper layers (e.g. the network or IP layer) and forwards it to the RLC layer, and vice versa;
3. Reordering of the downlink RLC SDUs at least during inter-evolved Node-B (eNB) mobility;
4. In-sequence delivery of upper layer packet data units (PDUs) at handover (HO) in the uplink;
5. Duplicate detection of lower layer SDUs; and
6. Ciphering of user plane data and control plane data (NAS Signaling).

The transmitting PDCP entity performs the following PDCP procedures or functions:
1. Assigns sequence numbers (SN) to upper layer PDUs, (i.e., PDCP SDU), on a per-radio bearer (RB) basis: Packets that are internally generated within the PDCP sublayer such as ROHC feedback packets will not be assigned a SN; and SNs will be continued during handover, (i.e., SNs are transferred between eNBs (if configured)).
2. Performs ROHC header compression: For user-plane traffic only; and ROHC-TCP and ROHC-real time protocol (RTP)/user datagram protocol (UDP)/Internet protocol (IP) will be supported.
3. Performs integrity protection: For control-plane traffic only; Utilizes the SDU SN assigned by the PDCP sublayer; Integrity protection may be performed before or after ciphering; Packets that are internally generated within the PDCP sublayer such as ROHC feedback packets will not be integrity-protected.
4. Performs ciphering: Utilizing the SDU SN assigned by the PDCP sublayer; Packets that are internally generated within the PDCP sublayer such as ROHC feedback packets will not be ciphered.
5. Attaches the PDCP header and sends the PDCP PDU to the RLC entity below.

When a PDCP PDU is received, the receiving PDCP entity performs the following PDCP procedures or functions:
1. Checks whether the PDU is control or data, and forwards it to the proper function. For example, ROHC feedback packets will be sent to the ROHC function.
2. Performs deciphering: Utilizes the SDU SN assigned by the PDCP sublayer together with the hyper frame number (HFN) which is calculated using an "HFN delivery function" that can handle out-of-order reception.
3. Checks for integrity: For control-plane traffic only; and Integrity checking may be performed before or after deciphering.
4. Performs ROHC header decompression: For user-plane traffic only.
5. Performs duplicate detection by utilizing the SDU SN assigned by the PDCP sublayer.
6. Performs reordering: Utilizes the SDU SN assigned by the PDCP sublayer.
7. Delivers the PDCP SDUs in-sequence to upper layers.

The PDCP sublayer transfers data between the RLC sublayer and the eNB. During inter-eNB handover, the source eNB forwards all downlink PDCP SDUs with their SN that have not been acknowledged by the wireless transmit/receive unit (WTRU) to the target eNB. The target eNB re-transmits and prioritizes all downlink PDCP SDUs forwarded by the source eNB.

During inter-eNB handover, the source eNB also forwards uplink PDCP SDUs successfully received in-sequence to the system architecture evolution (SAE) Serving Gateway, and forwards uplink PDCP SDUs received out-of-sequence to the target eNB with their SN. The WTRU re-transmits the uplink PDCP SDUs that have not been successfully received by the source eNB.

The PDCP sublayer buffers the PDCP SDUs in order to be able to (re)transmit any un-received SDUs, (e.g., during handover situations). In the uplink, the transmitting PDCP entity in the WTRU will retransmit the SDUs that were not acknowledged by the PDCP Status Report received from the Target eNB for example. In the downlink, the transmitting PDCP entity in the Source eNB forwards the SDUs that were not acknowledged to the Target eNB, and the Target eNB (re)transmits the SDUs that were not acknowledged by the PDCP Status Report received from the WTRU for example.

PDCP Status Reports: A PDCP status report is used to convey the information on missing or acknowledged PDCP SDUs (or PDUs) at handover. Status reports are sent from the receiving PDCP entity to the transmitting PDCP entity. The purpose of PDCP Status Report is to identify which PDCP SDUs (or PDUs) need to be re-transmitted at events such as handover.

Primitives are signals or indications exchanged between layers within the device. Primitives between PDCP and upper layers: In universal mobile telecommunication system (UMTS) releases (up to Release 6), the PDCP-DATA primitive only allowed for two primitives, which are PCDP-DATA-Req and PDCP-DATA-Ind. The functions of the two primitives are:

PDCP-DATA-Req is used by upper user-plane protocol layers to request a transmission of upper layer PDU.

PDCP-DATA-Ind is used to deliver PDCP SDU that has been received to upper user plane protocol layers.

The RLC sublayer will also have its own transmit buffer, (i.e., in the RLC transmitting entity). This means that there are at least two transmit buffers in Layer 2, one at the PDCP sublayer and the other at the RLC sublayer. RLC SDU discard is one of the functions specified in the standards which specify that the triggers to initiate SDU discard include SDU discard timer expiration.

Since the PDCP sublayer buffers the PDCP SDUs in order to be able to retransmit them, (e.g., during handover scenarios), this necessitates the need for a buffer at the transmitting PDCP entity. This buffer may be used to store un-processed PDCP SDUs, or it may store partially processed PDCP SDUs, (for example, after applying one or more of the following processes/functions: sequence numbering, header compression, ciphering, integrity protection).

Buffering PDCP SDUs at the transmitting PDCP entity introduces new challenges such as determining the triggers/events that will lead to discarding a PDCP SDU from the transmitting PDCP buffer, (i.e., emptying the SDU from the PDCP buffer). There is also a need to avoid PDCP transmit buffer overflow. Furthermore, in some cases, such as when there is a long delay in scheduling the data, some PDCP SDUs can become stale or useless for transmission as their latency already exceeds the maximum allowed by their Quality of Service (QoS) profile.

Furthermore, since the transmitting RLC entity will have its own buffer and will implement timer-based SDU discard, the overall transmitting layer 2 entity can be optimized by optimizing/coordinating the discard operations between the PDCP and RLC, and by enhancing the RLC reset or re-establishment procedures. Therefore, an improved data discard procedure, applicable to the advanced high-speed wireless communications device and that is directed to both PDCP and RLC sublayers, is highly desirable.

SUMMARY

This application discloses a SDU/PDU discard function in the PDCP sublayer, and techniques for coordinating or communicating between the PDCP and RLC discard functions. The transmitting PDCP entity initiates the PDCP SDU discard operation based on one or more of the following events or triggers: (1) the expiration of a SDU/PDU discard timer (or the passage or elapse of certain time interval); (2) the reception of a notification from the underlying RLC sublayer; and (3) the reception of a PDCP Status Report from the peer PDCP entity. The RLC layer may discard the corresponding RLC SDU based on a notification from the PDCP layer.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION

Figure 1:
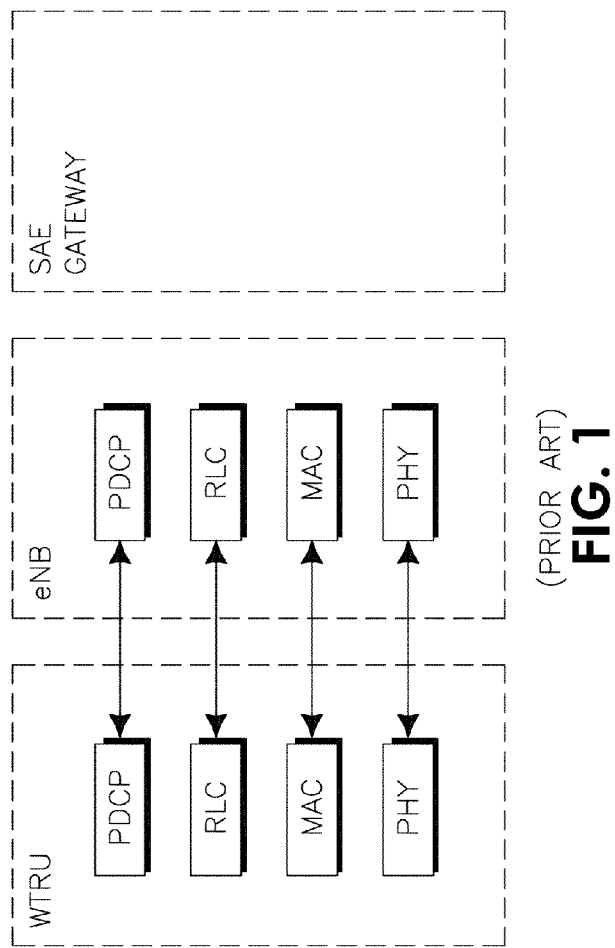
FIG. 1 shows LTE architecture's user-plane protocol stack including the layer 2 sublayers packet data convergence protocol (PDCP), radio link control (RLC) and medium access control (MAC).
Figure 2:
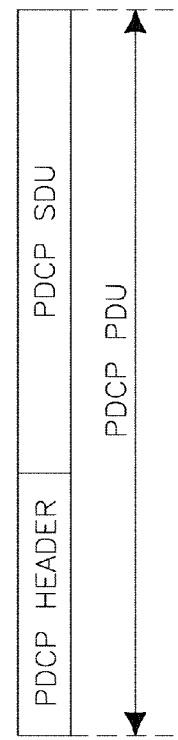
FIG. 2 shows the PDCP PDU structure comprising a PDCP SDU and a PDCP header. It is anticipated that the PDCP header may be either 1 or 2 bytes long.
Figure 3:
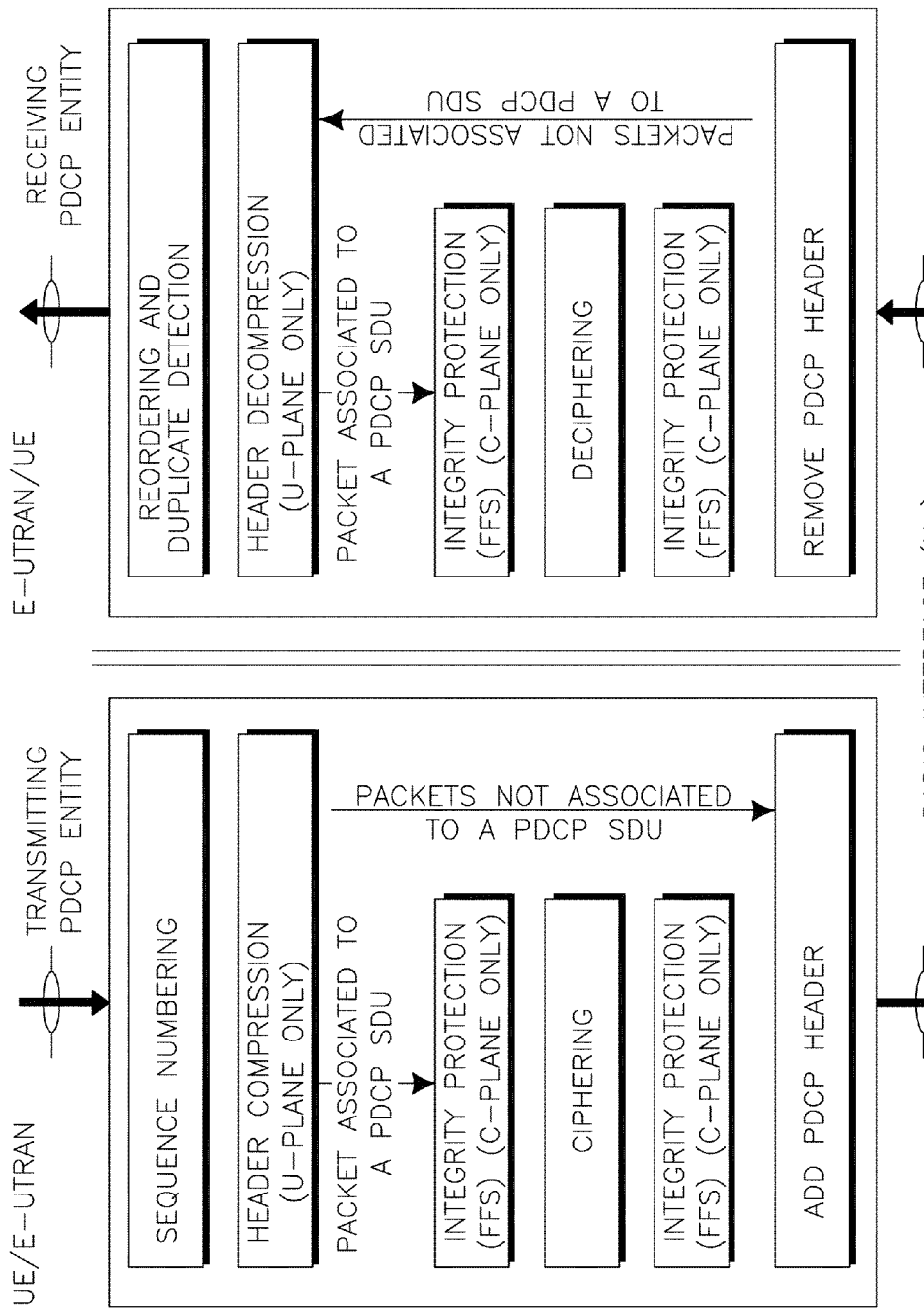
FIG. 3 shows the PDCP operations.
Figure 4:
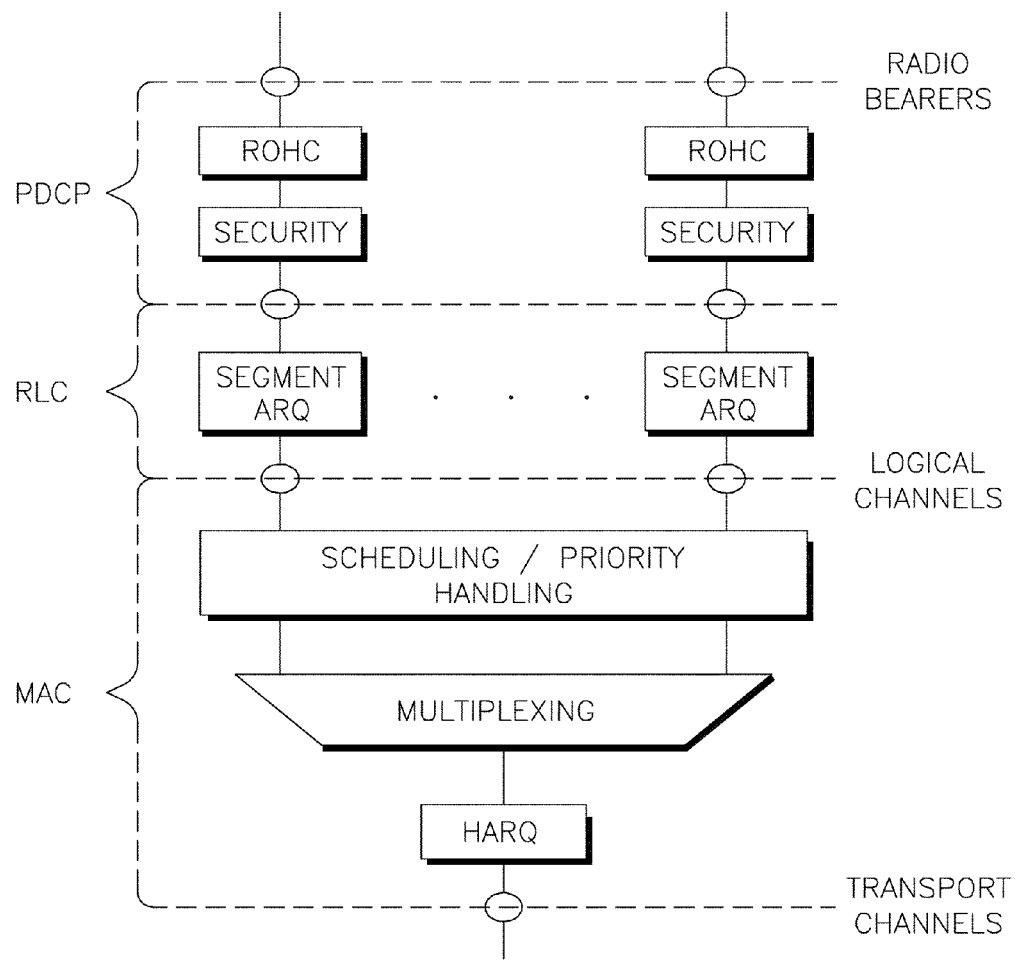
FIG. 4 shows some main functions of the LTE Layer 2 protocol stack at the transmitting device.

When referred to hereafter, the terminology "wireless transmit/receive unit (WTRU)" includes but is not limited to a UE, a mobile station, a fixed or mobile subscriber unit, a pager, a cellular telephone, a personal digital assistant (PDA), a computer, or any other type of user device capable of operating in a wireless environment. When referred to hereafter, the terminology "eNB" includes but is not limited to a Node-B, an Evolved Universal Terrestrial Radio Access Network (UTRAN) Node-B, a E-UTRAN Node-B, an evolved Node-B, a base station, a site controller, an access point (AP), or any other type of interfacing device capable of operating in a wireless environment. When referred to hereafter, the term PDCP refers to any of the following: a PDCP entity, the PDCP layer, PDCP sublayer or PDCP functions/protocol. When referred to hereafter the terms sublayer and layer may be used interchangeably. When referred to hereafter, the term packet B corresponding to packet A refers to a packet B that was created as a result of performing procedure(s) or function(s) or action(s) on packet A. When referred to hereafter, the term SDU/PDU refers to "SDU and/or its corresponding PDU." When referred to hereafter, the term SDUs/PDUs refers to "SDUs and/or their corresponding PDUs." When referred to hereafter, the term packet may refer to a PDCP packet or a RLC packet. When referred to hereafter, the term PDCP packet refers to "PDCP SDU and/or its corresponding PDU." When referred to hereafter, the term RLC packet refers to "RLC SDU and/or its corresponding PDU(s)." When referred to hereafter, the term reference event refers to an event that is typically associated with a packet and that is tied to the start or completion or progression of a procedure or function or action, such as the start or completion or progression of a PDCP procedure or function or action. When referred to hereafter, the term setting a timer refers to initializing and starting a timer. When referred to hereafter the term acknowledgement (ACK) is interchangeable with positive acknowledgment, and the term nonacknowledgement (NACK) is interchangeable with negative acknowledgment.

The application discloses a SDU/PDU discard function in the PDCP sublayer, and for coordinating or communicating between the PDCP and RLC discard functions. The discard operations discussed herein will occur if the discarding entity has previously received the packets to be discarded (PDCP SDU/PDU or RLC SDU/PDU). Alternatively, the discarding entity may attempt to discard the packet in question regardless of whether or not it has previously received the packet to be discarded.

In accordance with one embodiment, the transmitting PDCP entity initiates the PDCP SDU discard operation based on one or more of the following events or triggers: (1) the expiration of a SDU/PDU discard timer (or the passage or elapse of certain time interval); (2) the reception of a notification from the underlying RLC sublayer; and (3) the reception of a PDCP Status Report from the peer PDCP entity.

An elapsed time (time interval) is measured from the time of occurrence of a reference event such as receiving the SDU from the upper layers (variant 1), or submitting the SDU/PDU to the lower layer (variant 2). Other variants for reference events include storing the packet in a buffer, removing the packet from a buffer, or performing a certain PDCP procedure or function or action on the packet. The packet will be discarded if a certain (pre-configured) time threshold has elapsed.

Alternate ways of implementing timer based discard operation are described.

The transmitting PDCP entity may initialize a discard timer (DTP1) when/upon receiving the SDU from the upper layers, (e.g., upon inserting the PDCP SDU into the PDCP transmit buffer).

Alternatively, the transmitting PDCP entity may initialize the discard timer when/upon submitting the SDU/PDU to the lower layers for transmission, (i.e., to the RLC). In an alternate embodiment, the transmitting PDCP entity may have two SDU discard timers (DTP1 and DTP2); one corresponding to each of the above two variants.

Hereinafter, the notation DTP will be used to generally refer to either one or both of those two discard timers, DTP1 and DTP2, at PDCP.

A new PDCP discard function is summarized as follows:

Option 1: In the transmitting PDCP entity, a new discard timer (DTP1) is started upon reception of a PDCP SDU from upper layers. When the discard timer (DTP1) expires, the transmitting PDCP entity discards the associated SDU/PDU (or SDUs/PDUs, in case more than one SDU/PDU are associated with the same timer).

DTP1 can be implemented via the use of an incrementing counter of time units (incrementing timer) e.g. the incrementing timer is initialized to zero, and expires when it is equal to or higher than a certain (pre-configured) time threshold. Alternatively, DTP1 can be implemented via the use of a decrementing counter of time units (decrementing timer) e.g. the decrementing timer is initialized to a certain (pre-configured) time threshold, and expires when it is equal to or lower than zero.

Alternatively, DTP1 can be implemented via the use of time-stamps. A time-stamp is created and associated with a PDCP SDU/PDU upon its reception from upper layers. The time-stamp records or stores (contains) the time of reception from upper layers. If the difference between the current time and the PDCP SDU's time-stamp reaches or exceeds a certain (pre-configured) time threshold, the transmitting PDCP entity discards the associated SDU/PDU (or SDUs/PDUs, in the case where more than one SDU/PDU are associated with the same time-stamp).

Option 2: In the transmitting PDCP entity, a new discard timer (DTP2) is started upon sending a PDCP SDU/PDU to lower layers for transmission (i.e. to RLC). When the discard timer (DTP2) expires, the transmitting PDCP entity discards the associated SDU/PDU (or SDUs/PDUs, in case more than one SDU/PDU are associated with the same timer).

DTP2 can be implemented via the use of an incrementing counter of time units (incrementing timer) e.g. the incrementing timer is initialized to zero, and expires when it is equal to or higher than a certain (pre-configured) time threshold. Alternatively, DTP2 can be implemented via the use of a decrementing counter of time units (decrementing timer) e.g. the decrementing timer is initialized to a certain (pre-configured) time threshold, and expires when it is equal to or lower than zero.

Alternatively, DTP2 can be implemented via the use of time-stamps. A time-stamp is created and associated with an PDCP SDU/PDU upon sending it to lower layers for transmission (i.e. to RLC). The time-stamp records or stores the time of sending to lower layers. If the difference between the current time and the PDCP SDU's time-stamp reaches or exceeds a certain (pre-configured) time threshold, the transmitting PDCP entity discards the associated SDU/PDU (or SDUs/PDUs, in the case where more than one SDU/PDU are associated with the same time-stamp).

The transmitting PDCP entity may start a separate discard timer for every SDU it receives (i.e. there will be a per-packet measure of elapsed time, in the form of a timer, or in the form of a timestamp).

Figure 11:
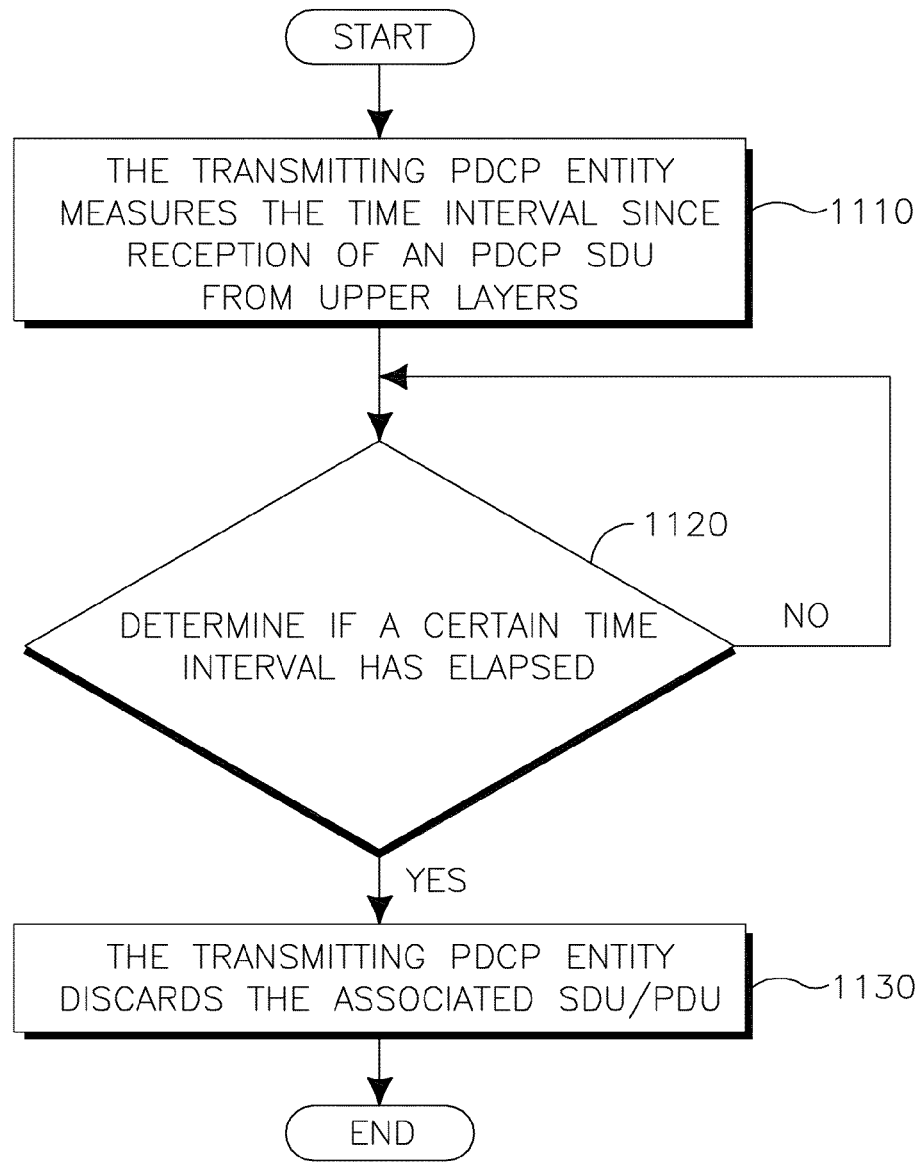
FIG. 11 shows a flow chart of a PDCP SDU/PDU discard procedure.

For example, in FIG. 11 at 1110, the transmitting PDCP entity measures the time interval since reception of a PDCP SDU from upper layers. At 1120, the transmitting PDCP entity determines if a certain time interval has elapsed. If so, at 1130, the transmitting PDCP entity discards the associated SDU/PDU.

The discard timer DTP is configured by other layers, (e.g., the Radio resource Control Layer (RRC)). For example, as part of the Radio Bearer (RB) configuration parameters, the values (thresholds) of the PDCP SDU discard timer may be specified on a per-RB basis. It may also be possible to adapt the value of the DTP, for example, via increasing the DTP value during handover scenarios.

The transmitting RLC entity may have its own timer-based discard operation. If so, it is possible that the LTE RLC will start its own discard timer upon receiving the RLC SDU, (i.e., the PDCP PDU), from the upper layer, (i.e., from PDCP). The RLC discard timer is referred to as DTR. When the DTR expires, the transmitting RLC entity discards the associated SDU/PDU (or SDUs/PDUs, in case more than one SDU/PDU is associated with the same timer).

DTR can be implemented via the use of an incrementing counter of time units (incrementing timer) e.g. the incrementing timer is initialized to zero, and expires when it is equal to or higher than a certain (pre-configured) time threshold. Alternatively, DTR can be implemented via the use of a decrementing counter of time units (decrementing timer) e.g. the decrementing timer is initialized to a certain (pre-configured) time threshold, and expires when it is equal to or lower than zero.

Alternatively, DTR can be implemented via the use of time-stamps. A time-stamp is created and associated with an RLC SDU upon its reception from upper layers. The time-stamp records or stores the time of reception from upper layers. If the difference between the current time and the RLC SDU's time-stamp reaches or exceeds a certain (pre-configured) time threshold, the transmitting RLC entity discards the associated SDU (or SDUs/, in case more than one SDU are associated with the same time-stamp).

The coordination of the values of the PDCP and the RLC discard timers is disclosed herein. A given packet, (i.e. the SDU/PDU), will necessarily spend some time in the transmitting PDCP entity's buffer. In order to improve/optimize the overall Layer 2 transmitter SDU discard operations and also improve QoS, the RLC timer-based discard functionality takes into account the time that a packet has spent in the PDCP layer.

Figure 9:
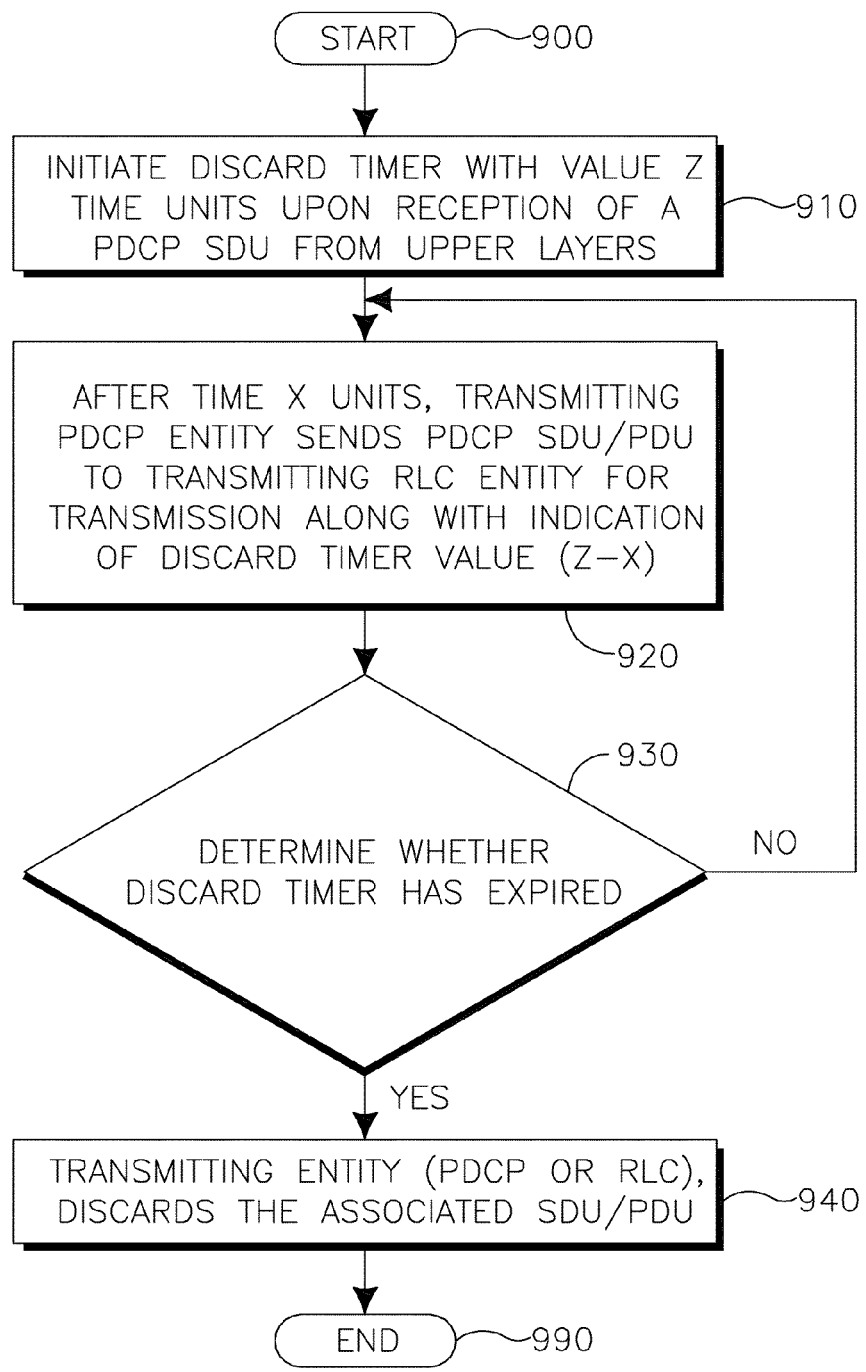
FIG. 9 is a flow chart of a discard procedure.

Although having independent PDCP and RLC SDU discard timers is possible, overall efficiency may be further enhanced, if the overall value of the discard timer is shared among the PDCP and the RLC. For example, if the QoS profile of a certain RB requires that a packet is not delayed by more than Z time units (where Z (a threshold) is the number of time units configured by the network operator e.g. via RRC signaling), such that the overall time that the packet spends in the PDCP transmit buffer and/or the RLC transmit buffer does not exceed Z, and that the packet is properly discarded if the overall time that the packet spends in the PDCP transmit buffer and/or the RLC transmit buffer reaches or exceeds Z. The following example illustrates the above procedure and is also depicted as a flow diagram in FIG. 9.

At 910, in the transmitting PDCP entity, a new discard timer, (e.g., DTP1), is started upon reception of an PDCP SDU from upper layers, whereby DTP1 is initialized with value Z time units (assuming a decrementing timer implementation for DTP1). At 920, after X time units (where X is the amount of time the SDU/PDU has spent in the PDCP entity before being submitted to the RLC), the transmitting PDCP entity submits/sends the PDCP SDU/PDU to lower layers, (i.e., to RLC), for transmission. The transmitting PDCP entity may provide along with the submitted PDCP PDU, (i.e., the RLC SDU), an indication of the remaining overall timer value, (i.e., Z-X e.g. in the case of a decrementing timer implementation), or of the time spent in the PDCP entity, (i.e., X e.g. in the case of an incrementing timer implementation). Such an indication may be signaled via new parameters for primitives, such as a new parameter for the RLC primitive RLC-yy-Data-Req (which is used by upper layers e.g. PDCP, to request the transmission of an RLC SDU).

In the transmitting RLC entity, the discard timer (DTR) is started upon reception of an RLC SDU, (i.e., PDCP PDU), from upper layers. The DTR is initialized with the value indicated/signaled from PDCP e.g. Z-X time units in the case where DTR is a decrementing timer or X time units in the case where DTR is an incrementing timer.

RLC-yy-Data-Req may be any of the RLC-AM-Data-Req, RLC-UM-Data-Req, RLC-TM-Data-Req primitive, or any other type of primitive or signal or indication. At 930, when the discard timer, (DTP1 or DTR), expires, the transmitting entity, (PDCP or RLC), discards the associated SDU/PDU, (or SDUs/PDUs in case more than one SDU are associated with the same timer) at 940.

Thus, in this embodiment the primitives or signals or indications used for communicating/signaling between the PDCP and the RLC in the transmitting node, (e.g., the WTRU in the case of uplink traffic, or the eNB in the case of downlink traffic), are enhanced by the addition of new parameters that, for example, enable the PDCP to communicate/indicate the timer value that should be used by the RLC SDU discard operation.

The previous operations and coordination between the PDCP and the RLC discard can be implemented via the use of time-stamps. A time-stamp is created and associated with an PDCP SDU upon its reception from upper layers. The time-stamp records or stores the time of reception from upper layers. The transmitting PDCP entity submits/sends the PDCP SDU/PDU to lower layers, (i.e., to RLC), for transmission. The transmitting PDCP entity may provide along with the submitted PDCP PDU, (i.e., the RLC SDU), the value of the time-stamp. In the transmitting RLC entity, the time-stamp is checked against the current time. If the difference between the current time and the PDCP PDU's or RLC SDU's time-stamp reaches or exceeds a certain (pre-configured) time threshold, the transmitting RLC entity discards the associated SDU/PDU (or SDUs/PDUs, in case more than one SDU/PDU are associated with the same time-stamp).

In another alternative embodiment, an overall Layer 2 timer-based SDU discard function is implemented wherein a single timer is used, which is optionally located in the PDCP layer or entity, (i.e., the RLC SDU discard timer may not be needed).

Once the PDCP layer or entity decides to discard a packet (e.g. upon expiration of the timer), it will communicate/signal to the RLC layer or entity, (e.g., via a primitive), an indication/identification of the packet discarded by PDCP. Upon receiving such indication, the transmitting RLC entity will also discard the SDU identified in the primitive.

For this particular mechanism the transmitting PDCP entity notifies the transmitting RLC entity of the PDCP transmitting entity's discard decision and discarded packet information, and the mechanism is still applicable even if there is an RLC SDU discard timer in the transmitting RLC entity, (i.e., the two may co-exist). This mechanism may still be applicable when the PDCP discarding decision is based on criteria (events/triggers) other than the timer-based PDCP SDU discard.

Figure 10:
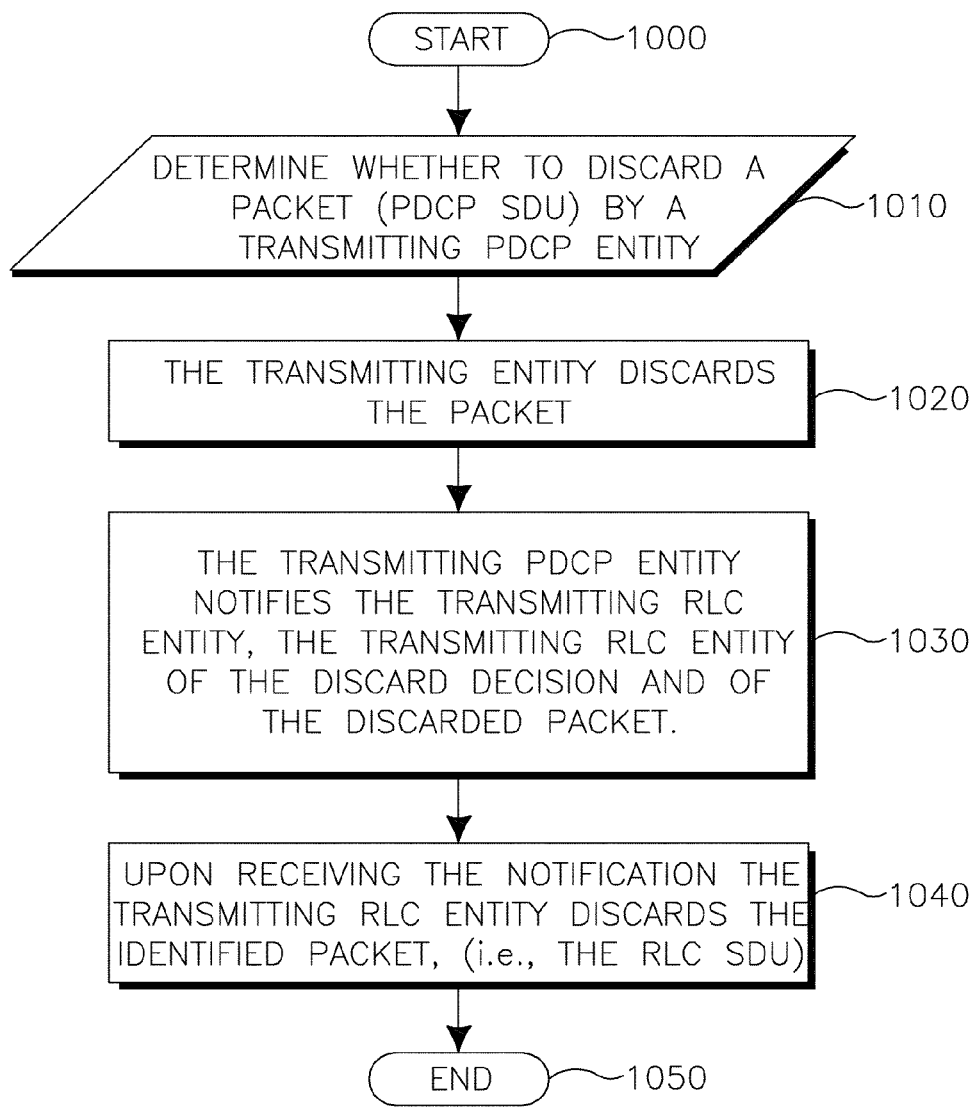
FIG. 10 is a flow chart of another example discard procedure.

This embodiment is summarized in FIG. 10 as follows:

At 1010, the transmitting PDCP entity determines whether to discard a packet (PDCP SDU/PDU) based on a trigger event, (for example, timer-based SDU/PDU discard, or reception of a PDCP Status Report from the peer PDCP entity acknowledging the PDCP SDU/PDU);

At 1020, the transmitting PDCP entity discards the packet;

At 1030, the transmitting PDCP entity notifies the lower layer, (i.e., the transmitting RLC entity of the discard decision and of the discarded packet), via a signal, (e.g., a primitive and its parameters); and At 1040, upon receiving the signal, (e.g., a primitive and its parameters), the transmitting RLC entity discards the identified packet, (i.e., the RLC SDU and/or its associated RLC PDUs).

It is possible for the RLC to have other discard triggers, (e.g., based on RLC ARQ Status Reports, and reaching the maximum number of ARQ retransmissions, etc.). The timer-based discard may be removed from the RLC and a new timer-based discard mechanism is introduced/started in PDCP in order to optimize and simplify the overall Layer 2 operations.

In another embodiment, communicating or preserving the values of the PDCP and/or RLC discard timers is provided, instead of re-initializing the timers from default values when a WTRU moves to a target eNB or when a PDCP entity is re-established. This enhances the Quality of Service (QoS) and also provides a more accurate and robust discard timer operation in future wireless systems.

In the case of downlink transmission, during inter-eNB handover, data forwarding from the source eNB to the target eNB will occur. This can be implemented in any of the following variants:

The source eNB may send the present (e.g. remaining, or approximate) value of the PDCP SDU discard timer (e.g. DTP) to the target eNB along with the forwarded PDCP SDU.

Alternatively, the source eNB may send the present (e.g. remaining, or approximate) value of the RLC SDU discard timer (e.g. DTR) to the target eNB along with the forwarded PDCP SDU.

Alternatively, the source eNB may send the lower of the present (e.g. remaining, or approximate) value of the RLC SDU discard timer (e.g. DTR) or the PDCP SDU discard timer (e.g. DTP), to the target eNB along with the forwarded PDCP SDU.

The target eNB initializes the PDCP and/or RLC discard timers by using the value(s) sent from the source eNB, instead of re-initializing them from scratch (i.e. from the default values).

In the case of an uplink transmission, the values of the PDCP discard timers in the PDCP entity are not re-initialized by the transmitting PDCP entity of the WTRU, but are preserved and continued during handover or during PDCP re-establishment in general.

While the prior art describes that the WTRU's RLC transmitting entity will be reset or re-established in the case of an uplink transmission during handover, this application discloses embodiments where the WTRU preserves the values of the RLC SDU discard timers instead of re-initializing them, assuming that the RLC will also implement its own timer discard mechanism.

In an embodiment, in the transmitting RLC entity, at the reset or re-establishment (e.g. during handover), the transmitting RLC entity discards/flushes the RLC PDUs (i.e. the segments or sub-segments) from its (re)transmit buffer, but keeps/maintains the RLC SDUs in its transmit buffer.

The transmitting RLC entity (or the WTRU in general) preserves (i.e. not re-initialize to default) the values of the RLC SDU discard timers associated with the RLC SDUs, and continues using those timers when the WTRU moves to the target eNB.

In another embodiment, at the reset or re-establishment (e.g. during handover), the transmitting RLC entity discards/flushes the RLC PDUs (i.e. the segments or sub-segments) from its (re)transmit buffer, and also discards/flushes the RLC SDUs in its transmit buffer.

The transmitting RLC entity (or the UE in general) preserves (i.e. not re-initialize to default) the values of the RLC SDU discard timers associated with the RLC SDUs, and associates those timer values with their corresponding SDU identifiers.

When the WTRU moves to the target eNB, the transmitting PDCP entity sends/submits RLC SDUs (i.e. PDCP PDUs) to the transmitting RLC entity. Based on the SDU identifiers, the transmitting RLC entity finds/associates the corresponding timer values with the identified SDUs, and initializes/sets the RLC discard timers by using those found (associated) value(s). If no corresponding timer values are found (e.g. in case of new RLC SDUs), the RLC discard timers are simply re-initialized to the default values.

In another embodiment, at the reset or re-establishment (e.g. during handover), the transmitting RLC entity discards/flushes the RLC PDUs (i.e. the segments or sub-segments) from its (re)transmit buffer, and also discards/flushes the RLC SDUs in its transmit buffer.

The transmitting RLC entity (or the WTRU in general) communicates the values of the RLC SDU discard timers associated with those discarded RLC SDUs up to the transmitting PDCP entity (e.g. via a primitive or signal or indication and its respective parameters).

When the WTRU moves to the target eNB, the transmitting PDCP entity sends/submits RLC SDUs (i.e. PDCP PDUs) to the transmitting RLC entity, along with the value to be used for the RLC SDU discard timer (e.g. via a primitive and its respective parameters) which was previously communicated by the transmitting RLC entity (i.e. in the prior step). The transmitting RLC entity initializes/sets the RLC discard timers by using the value(s) communicated back from the transmitting PDCP entity.

In another embodiment, at the reset or re-establishment (e.g. during handover) the transmitting RLC entity discards/flushes the RLC PDUs (i.e. the segments or sub-segments) from its (re)transmit buffer, and also discards/flushes the RLC SDUs in its transmit buffer.

When the UE moves to the target eNB, the transmitting PDCP entity sends/submits RLC SDUs (i.e. PDCP PDUs) to the transmitting RLC entity, along with the value to be used for the RLC SDU discard timer (e.g. via a primitive or signal or indication and its respective parameters). For example, such a value could be the time remaining before the PDCP discard timer expires. The transmitting RLC entity initializes/sets the RLC discard timers by using the value(s) communicated from the transmitting PDCP entity.

Although the examples above are illustrated assuming a handover case, other cases where an RLC reset or re-establishment is triggered may have similar effects on PDCP and RLC and their interactions. Hence, many of the above examples in relation to PDCP and RLC and their interactions may be applicable even when there is no handover (e.g. at times when the RLC is reset or re-established due to other events or triggers). Non-handover events or triggers that may lead to RLC re-establishment and the above PDCP behavior may include: RRC Connection Re-establishment, radio link failure, handover failure, integrity protection failure, RLC reaching the maximum number of transmissions, and RRC connection reconfiguration failure.

In another embodiment, PDCP SDU discard is triggered by a notification from the RLC sublayer. In this embodiment, the RLC sublayer has its own triggers for SDU discard. The PDCP SDU discard mechanism is triggered via information it receives from the underlying RLC sublayer.

In an embodiment, for example:
The transmitting RLC entity communicates information to the transmitting PDCP entity (e.g. via a primitive or signal or indication and its respective parameters).

The transmitting PDCP entity uses such information to discard a PDCP SDU from the PDCP transmit buffer.

The communicated information includes an identifier of the SDU(s) to be discarded. The communicated information may also include one or more of the following:

A simple discard signal (for one or more SDU(s)) sent from the transmitting RLC entity to the transmitting PDCP entity above, triggered by any RLC event.

A discard signal (for one or more SDU(s)) sent from the transmitting RLC entity to the transmitting PDCP entity above, triggered by an RLC SDU discard event.

Successful delivery notification/signal (i.e. the delivery of the SDU to the peer RLC entity was successful) based on the information from the RLC (ARQ) Status Reports or/and (possibly) HARQ.

Failed delivery notification/signal (i.e. the delivery of the SDU to the peer RLC entity was unsuccessful) based on the information from the RLC (ARQ) Status Reports or/and (possibly) HARQ.

Once the transmitting PDCP entity receives such discard trigger/signal from the underlying transmitting RLC entity, the transmitting PDCP entity discards the PDCP packet(s) to which the RLC SDU(s) correspond. Such a discard mechanisms may be applied in cases when there is no handover.

In another embodiment, PDCP SDU/PDU discard is triggered by information in the PDCP Status Report (or "PDCP Status PDU"). In this embodiment, the PDCP sublayer receives PDCP Status Reports that are exchanged/sent from the receiving PDCP entity to the transmitting PDCP entity.

In another embodiment, the PDCP SDU discard mechanism is triggered via information that the PDCP sublayer receives from the PDCP Status Report as follows:

The receiving PDCP entity communicates positive (ACK) or negative (NACK) acknowledgement information to the transmitting PDCP entity using the PDCP Status Report.

The transmitting PDCP entity uses such status report information to discard a PDCP SDU from the PDCP transmit buffer.

In general, the PDCP Status Report, and/or the information it contains, is used as a trigger for the PDCP SDU discard mechanism. For example, the transmitting PDCP entity discards PDCP SDUs/PDUs that were positively acknowledged via the PDCP Status Report.

The SDU discard triggers described above may be used independently, or may be combined with each other, and that various combinations based on the above may be constructed.

When the transmitting PDCP entity discards a PDCP SDU/PDU (based on one or more of the previously described triggers, or based on some other PDCP SDU discard trigger), the transmitting PDCP entity may or may not utilize explicit signaling (e.g. a PDCP move receiving window (MRW) mechanism) to notify the peer (i.e. the receiving) PDCP entity of the discarded SDU(s)/PDU(s). Such an explicit signal/message is used to convey the information (enable identification, etc.) on PDCP SDUs or PDUs that were discarded and/or can not be (re)transmitted by the transmitting PDCP entity. Upon receiving the message, the receiving PDCP entity will not wait for the packet(s) indicated/identified in the message, and can submit the earlier packets it has buffered to upper layers. A PDCP Control PDU may be used to carry such signal/message.

In accordance with one embodiment, an explicit signaling is used upon discard when discarding is triggered by the PDCP SDU timer-based discard trigger (i.e. upon timer expiration). The explicit signaling upon discard is triggered when the discard is not from a RLC delivery notification or PDCP Status Report (although it is possible to use it in such cases).

Before providing the signaling mechanisms upon discard of a PDCP PDU, two embodiments for performing the PDCP sequence numbering and buffering are disclosed.

Figure 5:
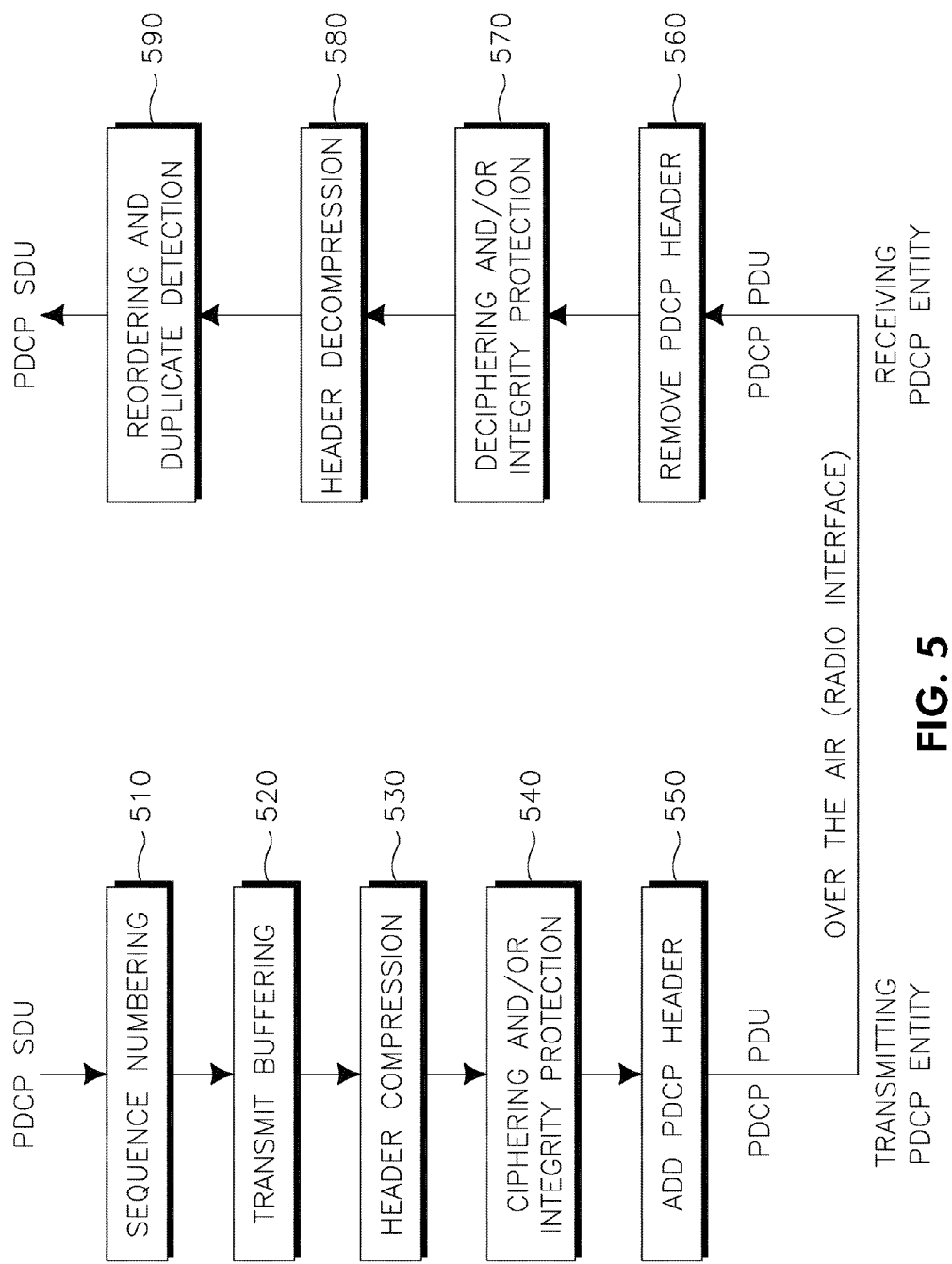
FIG. 5 shows a transmit PDCP entity configured to assign the PDCP sequence number (SN) to SDUs before buffering.

Embodiment 1: The transmitting PDCP entity assigns the PDCP SN before inserting the SDU into the PDCP transmit buffer. FIG. 5 shows a transmit PDCP entity configured to assign the PDCP SN to SDUs at 510 before buffering at 520.

Figure 6:
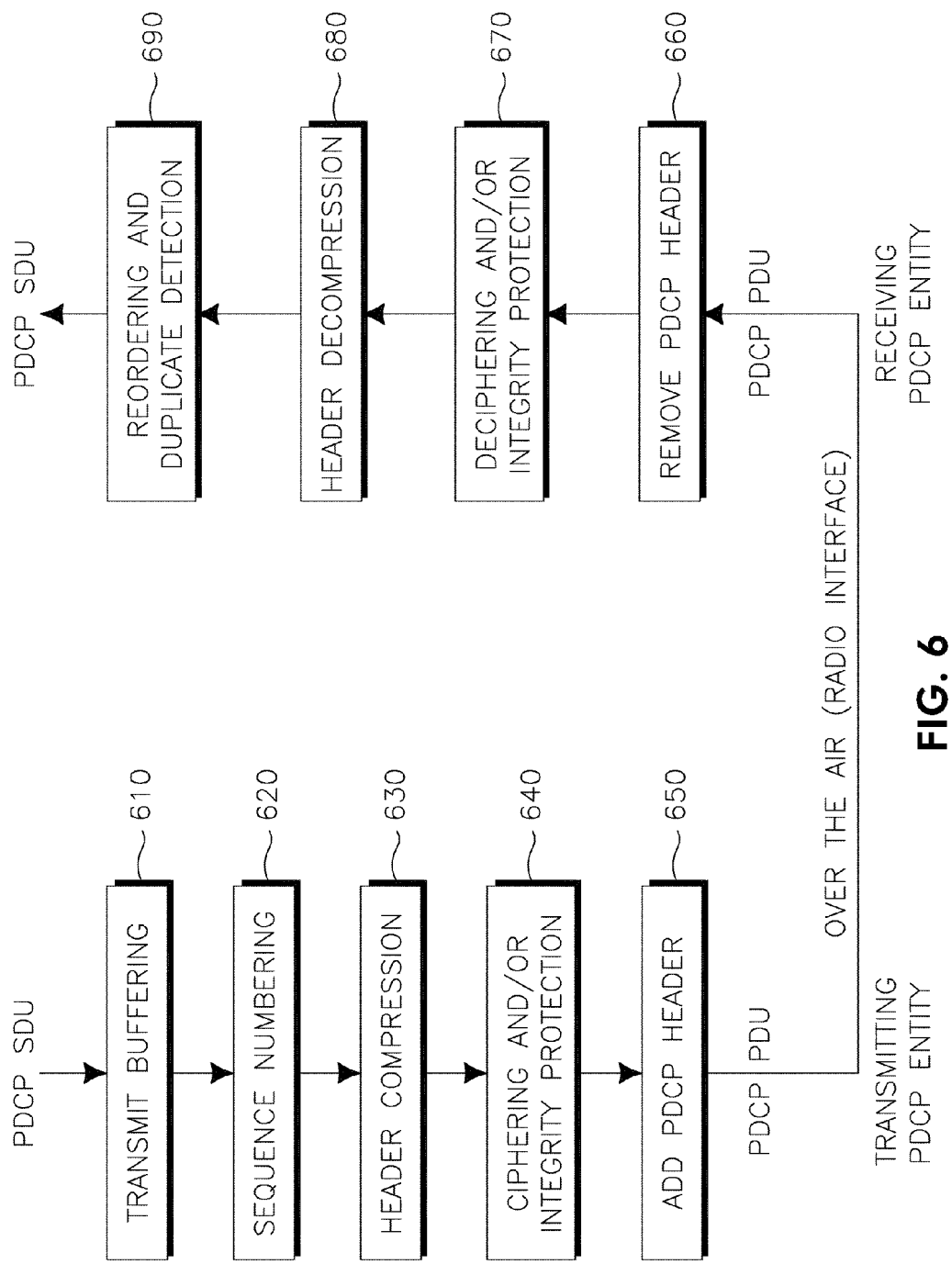
FIG. 6 shows a transmit PDCP entity configured to assign the PDCP SN to SDUs after buffering.

Embodiment 2: The transmitting PDCP entity assigns the PDCP SN after removing the SDU from the PDCP transmit buffer. FIG. 6 shows a transmit PDCP entity configured to assign the PDCP SN to SDUs at 620 after buffering at 610.

The embodiments shown in FIGS. 5 and 6 display certain PDCP functionalities, but it should be understood that this disclosure is applicable even if there are future changes or modifications to the PDCP sublayer's functionality, and it is also applicable when there are additional functionalities added to the PDCP sublayer.

Signaling mechanisms upon discarding a PDCP SDU (this may be referred to as PDCP SDU discard with explicit signaling) are described below. Upon discarding a PDCP SDU (due to a timer-discard, or other discard triggers), the transmitting PDCP entity sends a signaling message to the receiving PDCP entity to notify it of the SDU(s) discarded. The receiving PDCP entity adjusts/affects its operations accordingly. For example, the receiving PDCP entity receive window functions will not wait for the discarded SDU(s), and also the duplicate detection function and/or the reordering function will not wait for the discarded SDU(s), e.g., via adjusting their next expected PDCP SN's, or the reception status of the corresponding PDCP SDU/PDU. Such signaling message may be referred to as a PDCP MRW message, or PDCP "Transmitter Status Report", or any other name. A PDCP Control PDU may be used to carry such signaling message.

The above PDCP SDU discard with explicit signaling mechanism is used in Embodiment 1 shown in FIG. 5, (i.e., when sequence numbering 510 was done before the PDCP transmit buffering 520), as the SDUs in the buffer would already have sequence numbers associated with them, and it is beneficial to communicate that certain PDCP SDU SN's will not be delivered to the receiving PDCP entity.

In Embodiment 2 shown in FIG. 6, (i.e., when sequence numbering 620 is done after the PDCP transmit buffering 610), the discard operations do not affect sequence numbering 620, hence there is generally no need for the explicit signaling mechanism in this case.

In another embodiment, for traffic that makes use of unacknowledged mode (UM) RLC or transparent mode (TM) RLC, a transmitting PDCP entity that maps to (makes use of) UM RLC or TM RLC does not use explicit signaling upon discarding a PDCP SDU. This is especially useful if the PDCP reordering function at the receiving PDCP entity is not used. If PDCP reordering is used for UM or TM RLC modes, the PDCP discard with explicit signaling mechanism may be used.

In the case where PDCP window flow control is employed, (e.g., PDCP transmit window at the transmitter), upon discarding a PDCP SDU, the PDCP transmitter updates the window's "lower edge" (thus expanding the window) that in turn allows for more PDCP packets to be processed by the PDCP transmitter. The receiving PDCP entity's receive window may also be advanced if the transmitting PDCP entity explicitly signaled the discard.

In another embodiment, an RLC delivery notification may be used to advance the PDCP transmit window, (e.g., for the packets that were successfully confirmed by RLC). Similarly, the information contained in the PDCP Status Report may be used to advance the PDCP transmit window (e.g. for the packets that were successfully confirmed by PDCP Status Report).

In another embodiment, the receiving PDCP entity provides a service to upper layers (e.g. to the upper user-plane layers, or to the RRC layer) to inform them of SDUs that were discarded or that will not be delivered. This embodiment is accomplished using one or more of the following:

When the receiving PDCP entity receives an explicit discard notification (e.g. PDCP MRW, or any other signal) from the peer (i.e. from the transmitting PDCP entity) notifying it of discarded SDU(s), the receiving PDCP entity communicates/signals indication/identification information to the upper layers (e.g. via a primitive or signal or indication and its parameters) of the missing SDUs.

When the receiving PDCP entity's reordering function times out (i.e. stops waiting for an SDU, or skips a next expected PDCP SN, or detects a missing PDCP SN), the receiving PDCP entity communicates/signals indication/identification information to the upper layers (e.g. via a primitive or signal or indication and its parameters) of the missing SDUs.

When the receiving PDCP entity's receive window function advances (i.e. stops waiting for an SDU, or skips a next expected PDCP SN, or detects a missing PDCP SN), the receiving PDCP entity communicates/signals indication/identification information to the upper layers (e.g. via a primitive or signal or indication and its parameters) of the missing SDUs.

Hence, the PDCP-DATA-Ind primitive, which is used to deliver a received PDCP SDU to upper layers is enhanced to additionally deliver discard information, (e.g., support a DiscardInfo primitive parameter), for one or more discarded PDCP packets (SDUs) that will not be delivered to upper layers.

This disclosure in its entirety may be applicable even if there are future changes or modifications to the PDCP sublayer's functionality. For example, the teachings herein still apply if sequence numbering is done on a per PDCP PDU level instead of PDCP SDU level. The teachings may still be applicable even if there are additional functionalities added to the PDCP sublayer.

It should be noted that although many examples/descriptions above are illustrated assuming a handover case, other cases where an RLC reset or re-establishment is triggered may have similar effects on PDCP and RLC and their interactions. Hence, the teachings related to PDCP and RLC and their interactions may still be applicable even when there is no handover (e.g. at times when the RLC is reset or re-established due to other events or triggers). Non-handover events or triggers that may lead to RLC re-establishment and the above PDCP behavior may include: RRC Connection Re-establishment, radio link failure, handover failure, integrity protection failure, RLC reaching the maximum number of transmissions, and RRC connection reconfiguration failure.

Figure 7:
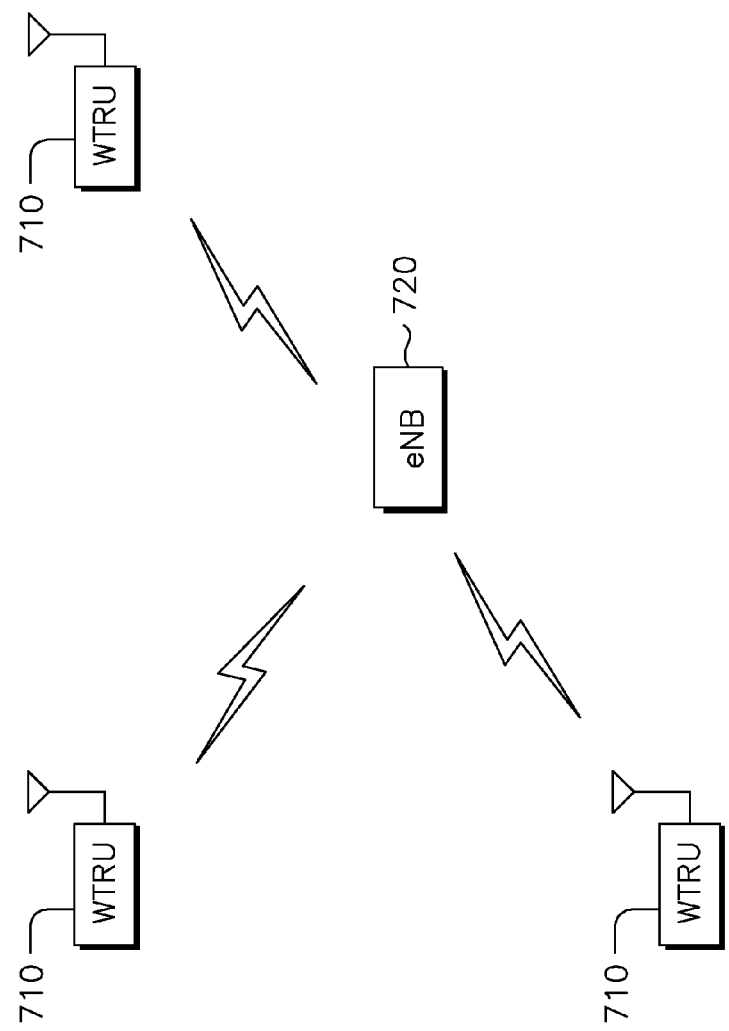
FIG. 7 shows a wireless communications system.
Figure 8:
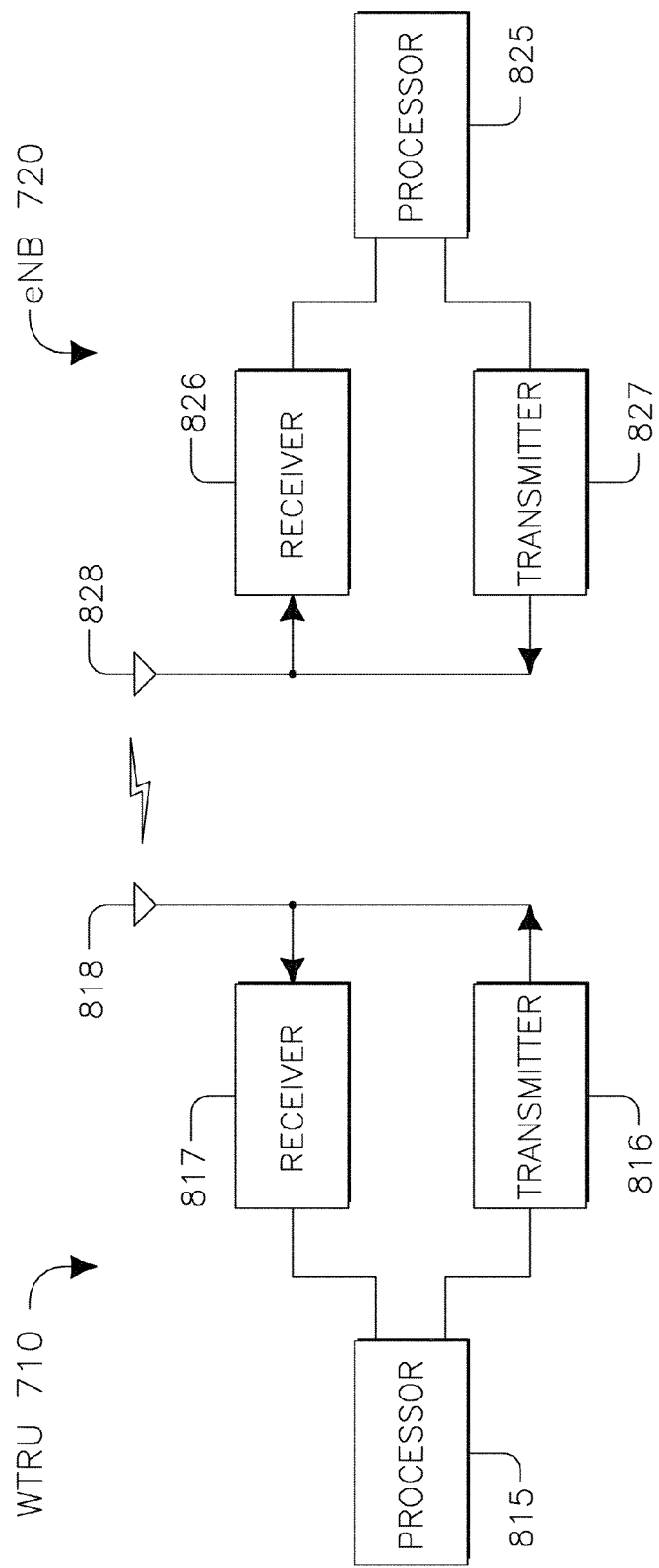
FIG. 8 is a functional block diagram of a WTRU and an E-UTRAN Node-B (eNB)

FIG. 8 is a functional block diagram of a WTRU 710 and the eNB 720 of the wireless communication network of FIG. 7. As shown in FIG. 7, the WTRU 710 is in communication with the evolved Node B (eNB) 720 and both are configured to perform methods as described above by their respective processors 815 and 825.

In addition to the components that may be found in a typical WTRU, the WTRU 710 includes the processor with a buffer 815, a receiver 817, a transmitter 816, and an antenna 818. The processor 815 is configured to perform PDCP discard and enhanced Layer 2 operations. The receiver 817 and the transmitter 816 are in communication with the processor 815. The antenna 818 is in communication with both the receiver 817 and the transmitter 816 to facilitate the transmission and reception of wireless data.

In addition to the components that may be found in a typical eNB 720, the eNB 720 includes the processor with a buffer 825, a receiver 826, a transmitter 827, and an antenna 828. The processor 825 is configured to perform PDCP discard and enhanced Layer 2 operations. The receiver 826 and the transmitter 827 are in communication with the processor 825. The antenna 828 is in communication with both the receiver 817 and the transmitter 816 to facilitate the transmission and reception of wireless data.

Although the features and elements are described in the preferred embodiments in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for discarding a packet data convergence protocol (PDCP) packet, the method comprising:
    a PDCP entity starting a timer upon reception of a PDCP service data unit (SDU) from an upper layer;
    the PDCP entity sending a corresponding PDCP PDU to a radio link control (RLC) entity;
    on condition that the timer expires, the PDCP entity discarding the PDCP SDU; and
    the PDCP entity sending an indication of the discard to the RLC entity.

2. The method of claim 1, further comprising the PDCP entity receiving a PDCP status report, wherein the PDCP status report acknowledges receipt by a receiving PDCP entity of at least one PDCP protocol data unit (PDU).

3. The method of claim 2, further comprising the PDCP entity discarding the at least one PDCP PDU and at least one corresponding PDCP SDU.

4. The method of claim 2, wherein the PDCP status report is received during a handover.

5. The method of claim 1, further comprising the PDCP entity creating the corresponding PDCP PDU, wherein creating the corresponding PDCP PDU comprises:
the PDCP entity assigning a sequence number (SN) to the PDCP SDU; and
the PDCP entity performing header compression on the PDCP SDU.

6. The method of claim 1, further comprising:
the RLC entity discarding an RLC SDU associated with the corresponding PDCP PDU based on receiving the indication from the PDCP entity.

7. The method of claim 1, wherein a separate timer is started for each PDCP SDU that includes user data received from an upper layer.

8. The method of claim 1, further comprising the PDCP entity transmitting a PDCP Control PDU.

9. The method of claim 1, wherein a threshold value of the timer is configured at a radio resource control (RRC) layer.

10. The method of claim 9, wherein the threshold value of the timer is configured on a per-radio bearer (RB) basis.

11. The method of claim 1, wherein the timer and an RLC discard timer are coordinated.

12. An evolved Node B (eNB) for discarding a packet data convergence protocol (PDCP) packet, the eNB comprising:
a PDCP entity configured to:
start a timer upon reception of a PDCP service data unit (SDU) from an upper layer,
send a corresponding PDCP PDU to a radio link control (RLC) entity,
discard the PDCP SDU on condition that the timer expires, and
send an indication of the discard to the RLC entity.

13. The eNB of claim 12, wherein the PDCP entity is further configured to receive a PDCP status report, wherein the PDCP status report acknowledges receipt by a receiving PDCP entity of at least on PDCP protocol data unit (PDU).

14. The eNB of claim 13, wherein the PDCP entity is further configured to discard the at least one PDCP PDU and at least one corresponding PDCP SDU.

15. The eNB of claim 13, wherein the PDCP entity is configured to receive the PDCP status report during a handover.

16. The eNB of claim 13, wherein the PDCP entity is configured to transmit a PDCP Control PDU.

17. The eNB of claim 12, wherein the PDCP entity is further configured to create the corresponding PDCP PDU and creating the corresponding PDCP PDU comprises:
the PDCP entity assigning a sequence number (SN) to the PDCP SDU; and
the PDCP entity performing header compression on the PDCP SDU.

18. The eNB of claim 12, wherein the eNB further comprises the RLC entity, and the RLC entity is configured to discard an RLC SDU associated with the corresponding PDCP PDU based on receiving the indication from the PDCP entity.

19. The eNB of claim 12, wherein the PDCP entity is configured to start a separate timer for each PDCP SDU that includes user data received from an upper layer.

20. The eNB of claim 12, wherein a threshold value of the timer is configured at a radio resource control (RRC) layer.

21. The eNB of claim 20, wherein the threshold value of the timer is configured on a per-radio bearer (RB) basis.

22. A wireless transmit/receive unit (WTRU) configured to discard a packet data convergence protocol (PDCP) packet, the WTRU comprising:
a PDCP entity configured to:
start a timer upon reception of a PDCP service data unit (SDU) from an upper layer,
send a corresponding PDCP PDU to a radio link control (RLC) entity,
discard the PDCP SDU of the timer expires, and
send an indication of the discard to the RLC entity.

23. The WTRU of claim 22, wherein the PDCP entity is further configured to receive a PDCP status report, wherein the PDCP status report acknowledges receipt by a receiving PDCP entity of at least on PDCP protocol data unit (PDU).

24. The WTRU of claim 23, wherein the PDCP entity is further configured to discard the at least one PDCP PDU and at least one corresponding PDCP SDU.

25. The WTRU of claim 23, wherein the PDCP entity is configured to receive the PDCP status report during a handover.

26. The WTRU of claim 23, wherein the PDCP entity is configured to transmit a PDCP Control PDU.

27. The WTRU of claim 22, wherein the PDCP entity is further configured to create the corresponding PDCP PDU and creating the corresponding PDCP PDU comprises:
the PDCP entity assigning a sequence number (SN) to the PDCP SDU; and
the PDCP entity performing header compression on the PDCP SDU.

28. The WTRU of claim 22, wherein the WTRU further comprises the RLC entity, and the RLC entity is configured to discard an RLC SDU associated with the corresponding PDCP PDU based on receiving the indication from the PDCP entity.

29. The WTRU of claim 22, wherein the PDCP entity is configured to start a separate timer for each PDCP SDU that includes user data received from an upper layer.

30. The WTRU of claim 22, wherein a threshold value of the timer is configured at a radio resource control (RRC) layer.

31. The WTRU of claim 30, wherein the threshold value of the timer is configured on a per-radio bearer (RB) basis.

* * * * *

UNITED STATES PATENT AND TRADEMARK OFFICE
CERTIFICATE OF CORRECTION

PATENT NO. : 8,855,047 B2
APPLICATION NO. : 12/240092
DATED : October 7, 2014
INVENTOR(S) : Mohammed Sammour and Stephen E. Terry It is certified that error appears in the above-identified patent and that said Letters Patent is hereby corrected as shown below:

In the Claims

Column 14, claim 1, line 60, "PDU" should be changed to --protocol data unit (PDU)--.

Column 16, claim 22, line 20, "PDU" should be to changed to --protocol data unit (PDU)--; line 23, "of the timer expires" should be changed to --upon an expiration of the timer--; claim 23, line 28, "on" should be changed to --one--.

Signed and Sealed this
Twenty-fourth Day of March, 2015

Michelle K. Lee
*Director of the United States Patent and Trademark Office*